United States Patent
Kim

(10) Patent No.: US 8,237,652 B2
(45) Date of Patent: Aug. 7, 2012

(54) LIQUID CRYSTAL DISPLAY APPARATUS AND CONTROL METHOD THEREOF

(75) Inventor: Young-kook Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 955 days.

(21) Appl. No.: 11/830,042

(22) Filed: Jul. 30, 2007

(65) Prior Publication Data

US 2008/0088573 A1    Apr. 17, 2008

(30) Foreign Application Priority Data

Oct. 16, 2006  (KR) .................. 10-2006-0100539

(51) Int. Cl.
*G09G 3/36*  (2006.01)

(52) U.S. Cl. .......................... 345/102; 353/57

(58) Field of Classification Search .......... 345/204; 353/578; 691/695

See application file for complete search history.

(56) References Cited

U.S. PATENT DOCUMENTS

| | | | |
|---|---|---|---|
| 5,991,153 A | 11/1999 | Heady et al. | |
| 6,104,451 A | 8/2000 | Matsuoka et al. | |
| 6,476,883 B1 | 11/2002 | Salimes et al. | |
| 6,522,543 B2 | 2/2003 | Kurihara et al. | |
| 6,809,780 B2 | 10/2004 | Sawai et al. | |
| 7,259,964 B2 | 8/2007 | Yamamura et al. | |
| 7,518,864 B2 | 4/2009 | Kimura | |
| 7,762,707 B2 | 7/2010 | Kim et al. | |
| 7,982,706 B2 | 7/2011 | Ichikawa et al. | |
| 2003/0128503 A1 | 7/2003 | Takahashi | |
| 2003/0218602 A1 | 11/2003 | Naito | |
| 2004/0233663 A1* | 11/2004 | Emslie et al. | 362/221 |
| 2005/0030485 A1* | 2/2005 | Oketani | 353/58 |
| 2005/0049729 A1* | 3/2005 | Culbert et al. | 700/50 |
| 2005/0168943 A1 | 8/2005 | Bang et al. | |
| 2006/0070280 A1 | 4/2006 | Yamamura et al. | |
| 2006/0104023 A1 | 5/2006 | Lee et al. | |
| 2006/0114267 A1* | 6/2006 | Park | 345/619 |
| 2006/0132699 A1 | 6/2006 | Cho et al. | |
| 2006/0146558 A1 | 7/2006 | Chen et al. | |
| 2006/0192750 A1* | 8/2006 | Lai | 345/102 |

FOREIGN PATENT DOCUMENTS

| | | |
|---|---|---|
| CN | 2321041 Y | 5/1999 |
| CN | 1573517 A | 2/2005 |
| CN | 1780548 A | 11/2005 |
| EP | 1318675 A2 | 6/2003 |
| JP | 9270975 A | 10/1997 |

(Continued)

OTHER PUBLICATIONS

Korean Office Action issued in counterpart application No. KR 10-2006-0100539 on Mar. 29, 2011.

*Primary Examiner* — Yong H Sim

(74) *Attorney, Agent, or Firm* — Sughrue Mion, PLLC

(57) ABSTRACT

A liquid crystal display (LCD) apparatus includes: an LCD panel which displays an image; a backlight unit which is formed of a plurality of light emitting diodes (LEDs) and emits light to the LCD panel; a cooling fan which radiates heat generated from the backlight unit; a fan driver which drives the cooling fan; and a controller which selectively controls either the fan driver or the backlight unit to set a rotation speed of the cooling fan to be corresponded with a luminance value of the backlight unit.

24 Claims, 7 Drawing Sheets

FOREIGN PATENT DOCUMENTS

| | | |
|---|---|---|
| JP | 2000-352708 A | 12/2000 |
| JP | 2002-023267 A | 1/2002 |
| JP | 2002-39654 A | 2/2002 |
| JP | 2002-311416 A | 10/2002 |
| JP | 2004-029388 A | 1/2004 |
| JP | 2005-340065 A | 12/2005 |
| KR | 10-2003-0071073 A | 9/2003 |
| KR | 10-2006-0016469 A | 2/2006 |
| KR | 10-2006-0026748 A | 3/2006 |
| KR | 10-2006-0030454 A | 4/2006 |
| KR | 10-2006-0056243 A | 5/2006 |
| KR | 10-2006-0059819 A | 6/2006 |
| KR | 10-2006-0070176 A | 6/2006 |
| KR | 10-2006-0070347 A | 6/2006 |
| KR | 10-2006-0086468 A | 7/2006 |

* cited by examiner

LIQUID CRYSTAL DISPLAY APPARATUS AND CONTROL METHOD THEREOF

CROSS-REFERENCE TO RELATED APPLICATIONS

This application claims priority from Korean Patent Application No. 2006-0100539, filed on Oct. 16, 2006 in the Korean Intellectual Property Office, the disclosure of which is incorporated herein by reference.

BACKGROUND OF THE INVENTION

1. Field of the Invention

Apparatuses and methods consistent with the present invention relate to a liquid crystal display (LCD) apparatus and a control method thereof and, more particularly, to a liquid crystal display (LCD) apparatus capable of lighting an LCD panel by using a light emitting diode (LED) backlight and a control method thereof.

2. Description of the Related Art

In general, application ranges of display devices are widely extended for various applications due to thin and light weighted design and low power consumption of the LCD apparatus. Accordingly, the LCD apparatus has been used in an office automation device and an audio/video device. Such an LCD apparatus is not a self emissive device, and therefore it requires a light source, like a backlight unit.

Particularly, recently, an increasing number of LCD apparatus adapt a backlight unit (BLU) using a light emitting diode (LED) as a light source. Since the LED is a semiconductor element, a lifetime is relatively long, a turn-on speed is relatively fast, a power consumption is low, and a color reproducibility is superior because each light source (e.g., a red LED, a blue LED, a green LED, and a white LED, etc.) can emit its own specific color. However, an operation of such an LED light source generates heat, and particularly, the number of LED elements increases when the size of the LCD apparatus is large, thereby generating more heat. The heat negatively affects an LED installed as a backlight light source unit of the LCD apparatus and peripheral devices, and therefore a cooling fan is provided to cool down the light source unit of the LCD apparatus.

Even if the internal parts are damaged by heat without a proper heat radiation when the cooling fan does not function, a user response to the problem is delayed and loss of the internal parts of the LCD apparatus occurs in a conventional LCD apparatus, since an immediate check of the cooling fan is not possible.

In addition, an improper operation in driving the cooling fan increases power consumption.

The above information disclosed in this Background section is only for enhancement of understanding of the background of the invention and therefore it may contain information that does not form the prior art that is already known in this country to a person of ordinary skill in the art.

SUMMARY OF THE INVENTION

Accordingly, it is an aspect of the present invention to provide a liquid crystal display (LCD) apparatus adapting an LED light source having an advantage of improved cooling efficiency by using a cooling fan.

In addition, an aspect of the present invention may have another advantage of reducing power consumption due to an operation of the cooling fan.

In addition, an aspect of the present invention may have other advantages of extending a lifetime of the cooling fan that cools down a light source provided in the LCD apparatus and increasing convenience of maintenance of the cooling fan.

The foregoing and/or other aspects of the present invention can be achieved by providing a liquid crystal display (LCD) apparatus comprising: an LCD panel which displays an image; a backlight unit which is formed of a plurality of light emitting diodes (LEDs) and emits light to the LCD panel; a cooling fan which radiates heat generated from the backlight unit; a fan driver which drives the cooling fan; and a controller which selectively controls either the fan driver or the backlight unit to set a rotation speed of the cooling fan to be corresponded with a luminance value of the backlight unit.

According to the embodiment of the present invention, the controller controls the backlight unit to reduce the luminance value of light emitted to the LCD panel when the rotation speed of the cooling fan is less than a predetermined reference speed.

According to the embodiment of the present invention, the controller receives a tacho signal of the cooling fan to detect the rotation speed.

According to the embodiment of the present invention, the controller controls to display at least one of the rotation speed, the luminance value, and an operation status of the cooling fan on the LCD panel.

According to the embodiment of the present invention, the controller controls the fan driver to reduce the rotation speed of the cooling fan to be less than a predetermined reference speed when the luminance value of light emitted to the LCD panel is less then a predetermined reference luminance value.

According to the embodiment of the present invention, the LCD apparatus further comprises a storage unit in which at least one luminance value is set.

According to the embodiment of the present invention, the controller controls the fan driver to rotate the cooling fan with the rotation speed that corresponds to the luminance value selected by a user from at least one luminance value stored in the storage.

The foregoing and/or other aspects of the present invention can be achieved by providing a liquid crystal display (LCD) apparatus comprising: an LCD panel which displays an image; a backlight unit which is formed of a plurality of light emitting diodes (LEDs) and emits light to the LCD panel; a cooling fan which radiates heat generated from the backlight unit; a fan driver which drives the cooling fan; a controller which controls the backlight unit to reduce a luminance value of light emitted to the LCD panel to be reduced when a rotation speed of the cooling fan is less than a predetermined reference speed.

According to the embodiment of the present invention, the controller receives a tacho signal of the cooling fan to detect the rotation speed.

According to the embodiment of the present invention, the controller controls to displays at least one of the rotation speed, the luminance value, an operation status of the cooling fan state on the LCD panel.

The foregoing and/or other aspects of the present invention can be achieved by providing a liquid crystal display (LCD) apparatus comprising: an LCD panel which displays an image; a backlight unit which is formed of a plurality of light emitting diodes (LEDs) and emits light to the LCD panel; a cooling fan which radiates heat generated from the backlight unit; a fan driver which drives the cooling fan; a controller which controls the fan driver to reduce a rotation speed of the cooling fan when a luminance value of light emitted to the LCD panel is less than a predetermined reference luminance value.

According to the embodiment of the present invention, the LCD apparatus further comprises a storage unit which stores at least one luminance value.

According to the embodiment of the present invention, the controller controls the fan driver to rotate the cooling fan with a rotation speed corresponding to the luminance value selected by a user from the at least one luminance value stored in the storage unit.

According to the embodiment of the present invention, the controller controls the fan driver to stop the cooling fan when the luminance value is less than the predetermined reference luminance value.

The foregoing and/or other aspects of the present invention can be achieved by providing a method for controlling a liquid crystal display (LCD) apparatus having a backlight unit formed of a plurality of light emitting diodes (LEDs) and a cooling fan which radiates heat generated from the backlight unit, the method comprising: detecting a rotation speed of the cooling fan; determining a luminance value of light emitted from the backlight unit; and selectively controlling either the cooling fan or the backlight unit so as to correspond the detected rotation speed with the determined luminance value.

According to the embodiment of the present invention, the method comprises reducing the luminance value of light emitted from the backlight unit when the rotation speed is less than a predetermined reference speed.

According to the embodiment of the present invention, the detecting of the rotation speed comprises receiving a tacho signal of the cooling fan.

According to the embodiment of the present invention, the method comprises displaying at least one of the rotation speed of the cooling fan, the luminance value of light emitted from the backlight unit, and an operation status of the cooling fan state on the LCD panel.

According to the embodiment of the present invention, the method comprises reducing the rotation speed of the cooling fan to be less than a predetermined reference speed when the luminance value of light emitted from the backlight unit is less than a predetermined reference luminance value.

According to the embodiment of the present invention, the method further comprises storing at least one luminance value.

According to the embodiment of the present invention, the method further comprises controlling the cooling fan to rotate with the rotation speed corresponding to the luminance value selected by a user from the stored luminance values.

The foregoing and/or other aspects of the present invention can be achieved by providing a method for controlling a liquid crystal display (LCD) apparatus having a backlight unit formed of a plurality of light emitting diodes (LEDs) and a cooling fan which radiates heat generated from the backlight unit, the method comprising: detecting a rotation speed of the cooling fan; and controlling a luminance value of light emitted to an LCD panel according to the detected rotation speed.

According to the embodiment of the present invention, the detecting of the rotation speed of the cooling fan comprises receiving a tacho signal of the cooling fan.

According to the embodiment of the present invention, the method further comprises generating an interface which displays the luminance value according to the rotation speed and displaying the luminance value on the LCD panel.

The foregoing and/or other aspects of the present invention can be achieved by providing a method for controlling a liquid crystal display (LCD) apparatus having a backlight unit formed of a plurality of light emitting diodes (LEDs) and a cooling fan which radiates heat generated from the backlight unit, the method comprising: determining a luminance value of light emitted from the backlight unit; and reducing a rotation speed of the cooling fan when the luminance value is less than a predetermined reference luminance value.

According to the embodiment of the present invention, the method further comprises storing at least one luminance value.

According to the embodiment of the present invention, rotating the cooling fan with the rotation speed corresponding to the luminance value selected by a user from the stored luminance values.

According to the embodiment of the present invention, the method comprises stopping the cooling fan when the luminance value is less than the predetermined reference luminance value.

BRIEF DESCRIPTION OF THE DRAWINGS

The above and/or other aspects and advantages of the prevent invention will become apparent and more readily appreciated from the following description of the exemplary embodiments, taken in conjunction with the accompanying drawings, in which.

DETAILED DESCRIPTION OF THE EMBODIMENTS

Figure 1:
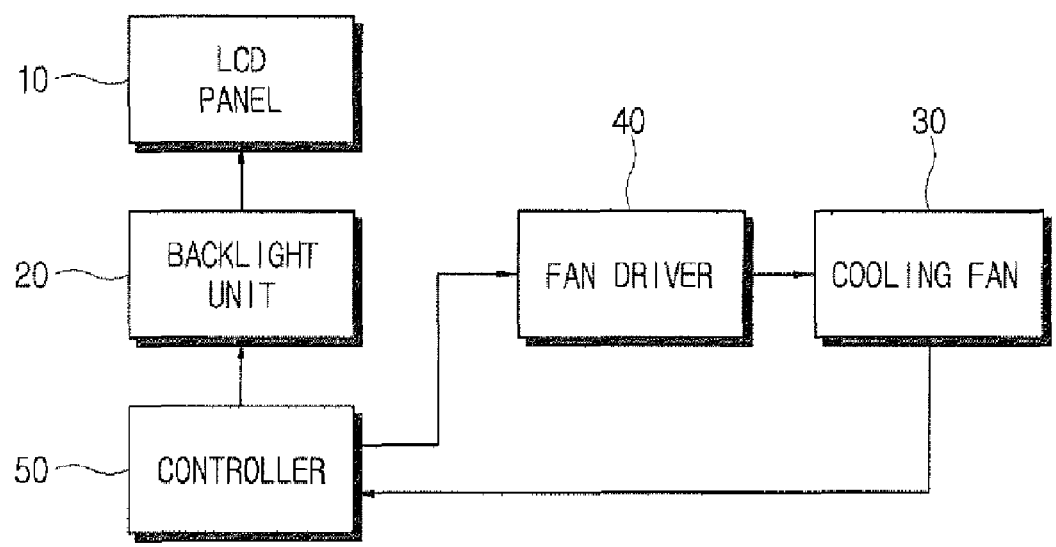
FIG. 1 is a control block diagram of a liquid crystal display (LCD) apparatus according to an exemplary embodiment of the present invention.

Reference will now be made in detail to the embodiments of the present invention, examples of which are illustrated in the accompanying drawings, wherein like reference numerals refer to like elements throughout. The embodiments are described below so as to explain the present invention by referring to the figures.

Hereinafter, exemplary embodiments of the present invention will be described in further detail with reference to the accompany drawings.

As shown in FIG. 1, a liquid crystal display (LCD) apparatus according to an exemplary embodiment of the present invention includes an LCD panel 10, a backlight unit 20, a cooling fan 30, a fan driver 40, and a controller 50 for controlling the elements.

The LCD panel 10 is formed of a plurality of liquid cells arranged in a matrix format and a plurality of control switches for switching a video signal to be applied to each liquid cell, and displays a desired-image by controlling the amount of light emitted from a light source.

The backlight unit 20 emits light corresponding to luminance of an input video signal so that an image can be displayed on the LCD panel 10 according to control of the controller 50. Herein, the backlight unit 20 includes a plurality of light emitting elements for emitting light. A light emitting diode is provided as the light emitting element according to an exemplary embodiment of the present invention.

The cooling fan 30 is provided inside the LCD apparatus, and radiates heat in the LCD apparatus while rotating at a predetermined rotation speed. In this case, the cooling fan 30 outputs a tacho signal which is a revolution per minute (rpm) signal of the rotation speed.

The fan driver 40 drives the cooling fan 30 at a predetermined rotation speed according to control of the controller 50.

The controller 50 receives the tacho signal output from the cooling fan 30 to detect the rotation speed. The cooling fan 30 according to the exemplary embodiment of the present invention may rotate at a speed of 2400 rpm in a normal driving condition. In this case, the controller 50 can evaluate a rotation speed as 120 Hz according to a driving frequency through a built-in counter (not shown) when receiving a tacho signal having a speed of 2400 rpm.

The controller 50 controls the backlight unit 20 to reduce a luminance value of the LCD panel 10 if the detected rotation speed of the cooling fan 30 is decreased lower than a predetermined reference speed.

For example, the controller 50 controls the backlight unit 20 to reduce luminance of the LED if the rotation speed of the cooling fan 30 is lower than 60 Hz.

In addition, the controller 50 outputs a message to inform that the cooling fan 30 is in an error state when the rotation speed of the cooling fan 30 is lower than 60 Hz. Herein, the controller 50 may display the message on an interface screen or may output the message by a predetermined alert sound through a speaker (not shown).

The controller 50 may control the backlight unit 20 or the fan driver 40 by rotating the cooling fan 30 corresponding to a luminance value of light emitted to the LCD panel 10 based on a lookup table in which a rotation speed corresponding to a luminance value is stored in a storage unit 70, which will be mentioned later.

Figure 2:
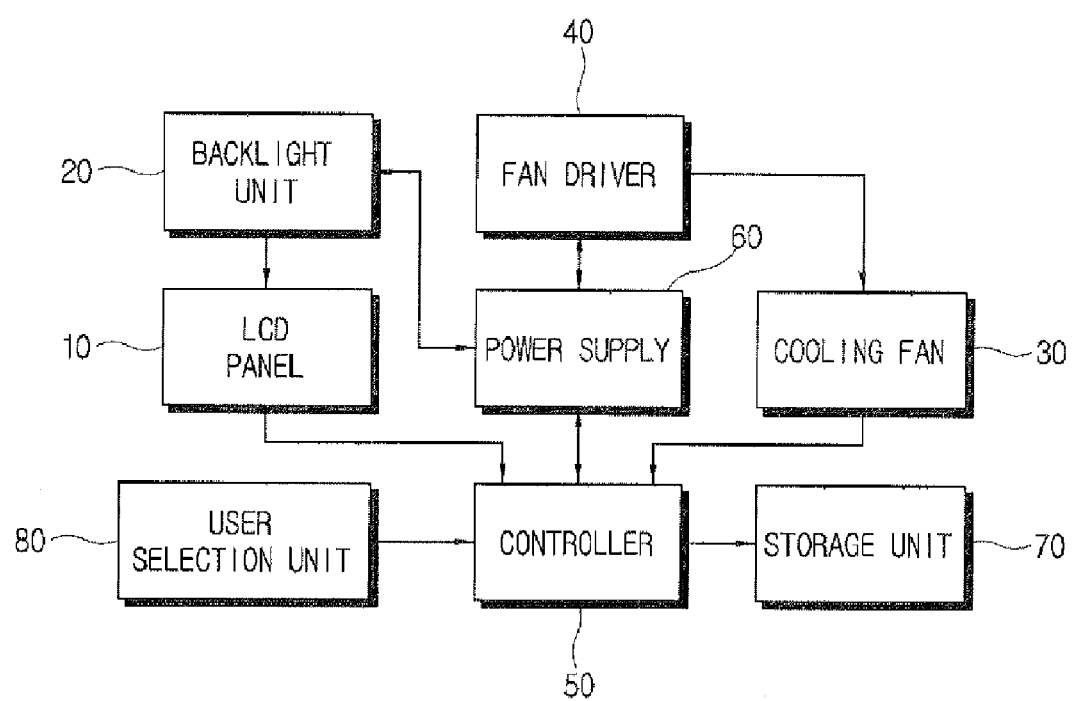
FIG. 2 is a control block diagram of an LCD apparatus according to an exemplary embodiment of the present invention.

The LCD according to the exemplary embodiment of the present invention may further includes a power supply 60, a storage unit 70, and a user selection unit 80, as shown in FIG. 2.

The power supply 60 supplies power to the backlight unit 20 for light emission of the LED, and supplies power to the fan driver 40 for driving the cooling fan 30. In this case, the power supply 60 supplies power by a pulse width modulation (PWM) according to control of the controller 50.

The storage unit 70 stores a mode that corresponds to a luminance value of light emitted to the LCD panel 10 from the backlight unit 20. Assume that the LCD apparatus according to the exemplary embodiment of the present invention can display luminance of 250 cd/m$^2$, at maximum, for example. The LCD apparatus may have other maximums for the display luminance.

The storage unit 70 may store sRGB mode with luminance of 80 cd/m$^2$ and an Adobe RGB mode with luminance of 160 cd/m$^2$.

The user selection unit 80 receives a selection command that selects a luminance value of light emitted to the LCD panel by a user. The user selection unit 80 may also receive various commands for driving the LCD apparatus, and may be provided as a button or a touch screen provided in the LCD panel.

The user selection unit 80 also can be realized by, for example, a remote controller, a key board having a plurality of key pads, or a mouse.

The controller 50 detects a luminance value of the backlight unit 20, and may decrease the rotation speed of the cooling fan 10 when the detected luminance value is less than a reference luminance value.

The reference luminance value may be set to a luminance value that can reduce heat generation in a degree not requiring the driving of the cooling fan 30 and can guarantee operation reliability of the LCD apparatus according to the luminance value.

Assume that the reference luminance value is, for example, 160 cd/m$^2$ in the exemplary embodiment of the present invention. Then, when a luminance value for driving the cooling fan 10 is set to be greater than 160 cd/m2 and either the SRGB mode or the Adobe RGB mode, stored in the storage unit 70, is selected by the user, the controller 50 controls the fan driver 40 to reduce the rotation speed of the cooling fan 30 or stop the cooling fan 30 since the set luminance value is less than the reference luminance value.

The controller 50 can reduce the rotation speed of the cooling fan 30 when a luminance value input by the user through the user selection unit 80 is less than the reference luminance value.

In this case, the controller 50 may have a predetermined rotation speed of the cooling fan 30 corresponding to an input luminance value.

Hereinafter, an operation of the LCD apparatus according to the exemplary embodiment of the present invention will be described in further detail with reference to the accompanying drawings.

Figure 3:
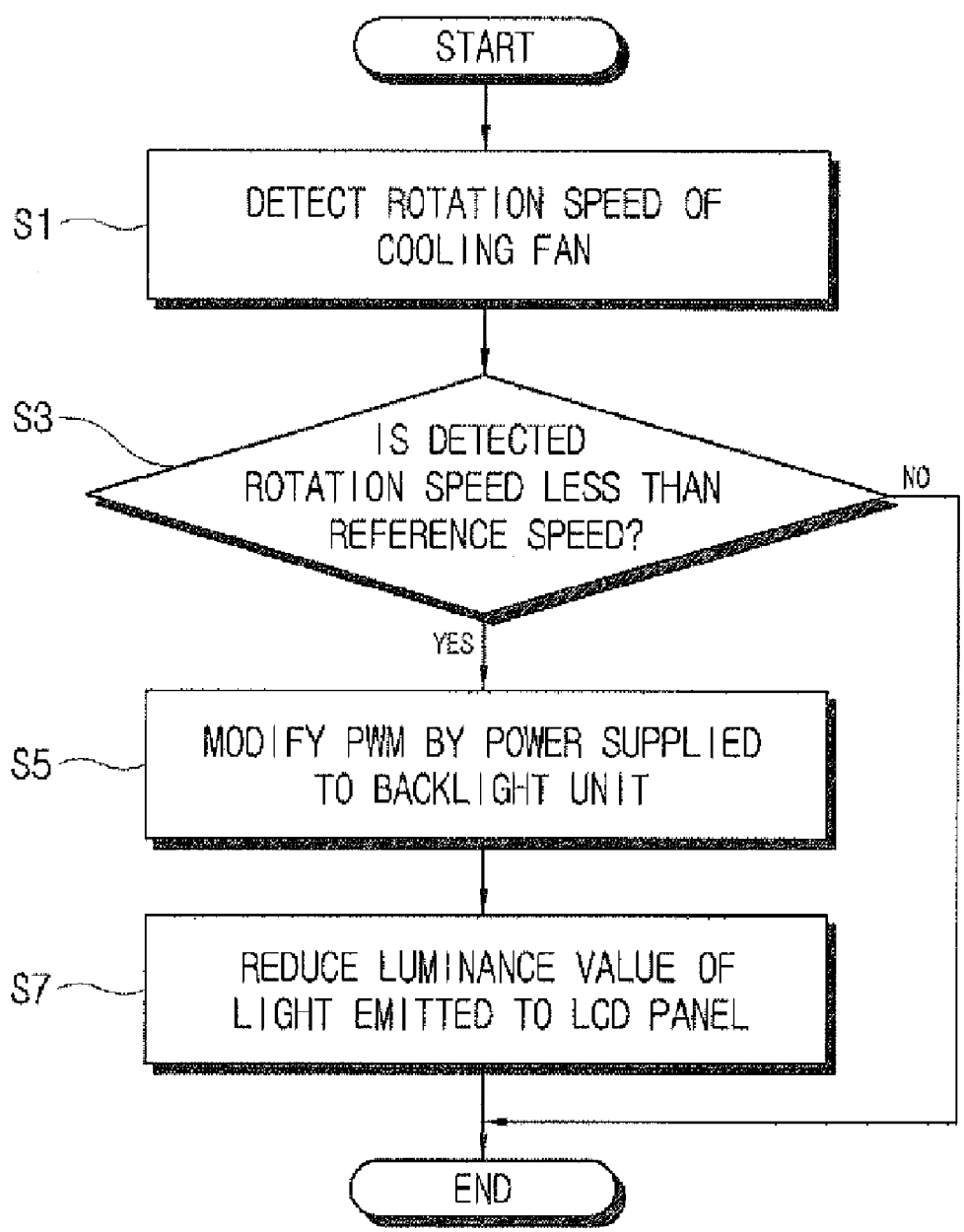
FIG. 3 is a control flowchart of the LCD apparatus according to an exemplary embodiment of the present invention.

FIG. 3 shows an operation of the LCD apparatus according to the exemplary embodiment of the present invention.

The controller 50 detects a rotation speed of the cooling fan 30 at operation S1. In this case, the controller 50 receives a tacho signal of a rotation speed output from the cooling fan 30 and detects the rotation speed according to a driving frequency.

The controller 50 determines whether or not the rotation speed of the cooling fan 30 is less than the reference speed at operation S3, and reduces a luminance value of light emitted to the LCD panel 10 by modifying the PWM of power supplied to the backlight unit 20 when the rotation speed of the cooling fan 30 is less than the reference speed, at operation S7. In this case, the controller 50 controls the power supply 60 to reduce a PWM duty ratio of the power supplied to the backlight unit 20, and accordingly, the amount of current applied to the LED is decreased. Therefore, the controller 50 reduces a luminance value of the backlight unit 20 that emits light to the LCD panel 10, at operation S7.

Figure 4:
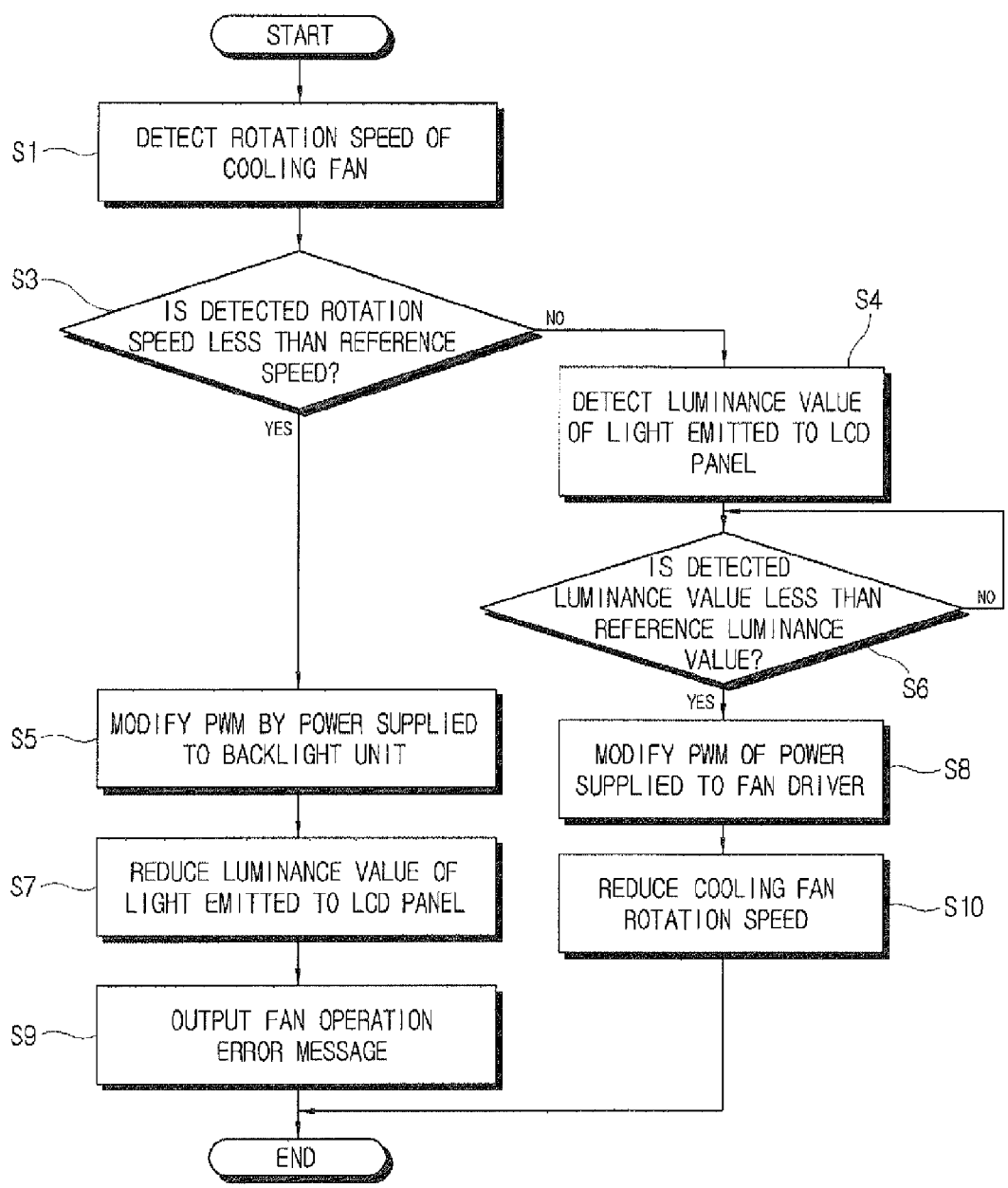
FIG. 4 is a control flowchart of an LCD apparatus according to the exemplary embodiment of the present invention.

The LCD apparatus can be operated as shown in FIG. 4 according to another exemplary embodiment of the present invention.

The controller 50 detects a rotation speed of the cooling fan 30, at operation S1. In this case, the controller 50 receives a tacho signal of a rotation speed output from the cooling fan 30 and detects the rotation speed according to driving frequency from the tacho signal.

The controller 50 determines whether or not the rotation speed of the cooling fan 30 is less than the reference speed at operation of S3, and reduces a luminance value of light emitted to the LCD panel 10 by modifying the PWM of power supplied to the backlight unit 20 at operation of S5 when the rotation speed of the cooling fan 30 is less than the reference speed.

In addition, the controller 50 outputs an error message indicating an operation error of the cooling fan 30, at operation S9. In this case, the controller 50 may turn on and off repeatedly an LED provided in a main body of the LCD apparatus, display a "fan driving error" or "error" message on the LCD panel 10, or output a predetermined alert sound through a speaker.

Figure 6A:
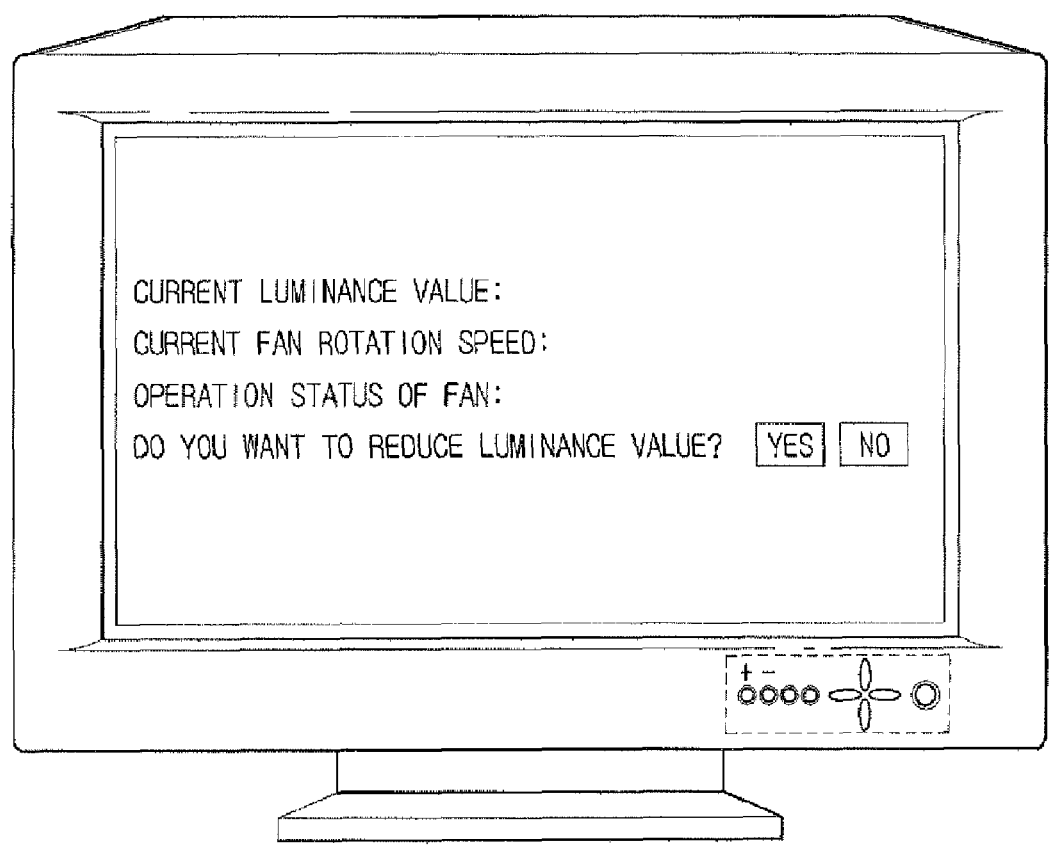
FIGS. 6A and 6B show an interface screen according to the exemplary embodiment of the present invention.

The controller 50 may display an interface screen through which a current luminance value, a current rotation speed of the cooling fan 30, an operation status of the cooling fan 30, and luminance control can be selected, as shown in FIG. 6A.

When the cooling fan 30 is driven in a normal state and thus the rotation speed of the cooling fan 30 is greater than the reference speed, the controller 50 detects a luminance value of light emitted to the LCD panel 10, at operation S4.

The controller 50 determines whether or not the detected luminance value is less than the reference luminance value at operation S6, and modifies the PWM duty ratio of the power supplied to the fan driver 40 at operation S8 when the detected luminance value is less than the reference luminance value. That is, the controller 50 reduces the PWM duty ratio of the power supplied to the fan driver 40 at operation S9 so that the rotation speed of the cooling fan is reduced at operation S10.

When the detected luminance value is low enough so that the heat radiation problem can be solved without driving the cooling fan 30, consumption of standby power can be prevented by reducing the rotation speed of the cooling fan 30 or stopping the cooling fan 30.

Figure 6B:
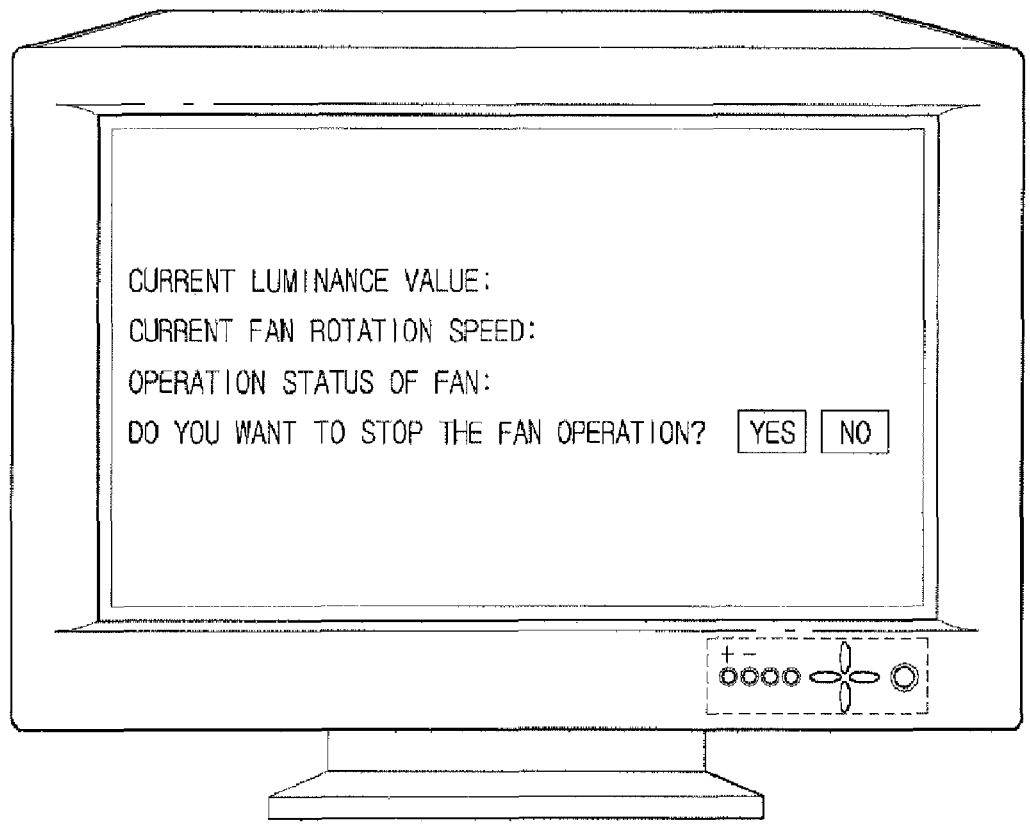

In addition, the controller 50 may display an interface screen through which a current luminance value, a cooling fan speed, a fan state, a fan stop option can be selected, as shown in FIG. 6B.

Figure 5:
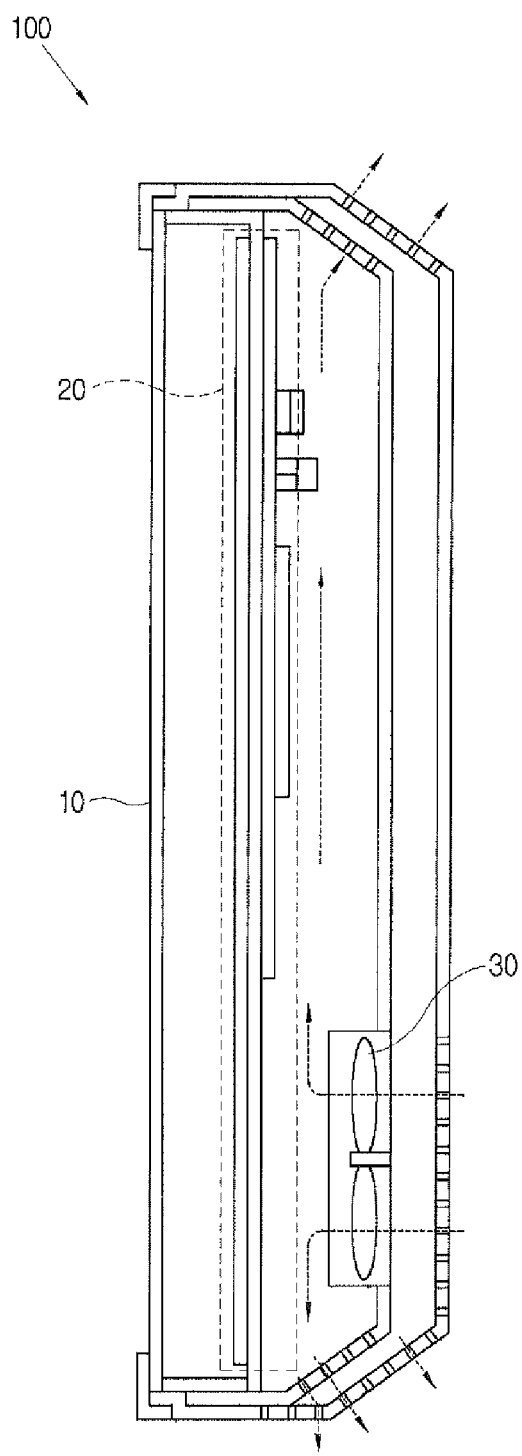
FIG. 5 is a schematic diagram of an LCD apparatus according to the exemplary embodiment of the present invention.

The cooling fan 30 according to the exemplary embodiment of the present invention can be provided in a main body 100 of the LCD apparatus as shown in FIG. 5.

As shown in FIG. 5, the cooling fan 30 is provided in a rear side of the backlight unit 20 in the main body 100. It may be provided in a lower portion of the main body 100.

An external air inlet through an air-slit provided in a rear side of the main body 100 due to rotation of the cooling fan 30 flows to a heat generation unit such as the backlight unit 20.

The air passed through the heating generation unit is outlet through a plurality of air-slits provided in an upper portion of the main body 100 and a plurality of air-slits provided in a rear side of the main body 100.

In this case, an inlet/outlet direction of an air current through the cooling fan 30 may vary depending on a position of the heat generation unit and the number of cooling fans 30. A cooling air current widely flows throughout a rear part of the backlight unit 20 and uniformly contacts with a surface of the backlight unit 20 so that a heat generation unit such as a widely arranged light source and circuit substrate can be efficiently cooled.

The cooling fan 30 of the display device according to an exemplary embodiment of the present invention may have another structure in which an external air passes a heat generation unit and radiates through the cooling fan 30.

A rotation direction of the cooling fan 30 can be changed according to a location of the cooling fan 30.

As described above, an LCD apparatus and a control method of the LCD apparatus according to the exemplary embodiment of the present invention detect a rotation speed of the cooling fan and reduce a luminance value of light emitted from the backlight unit when the rotation speed of the cooling fan is reduced, thereby enabling a user to easily detect an error in the cooling fan and prevent damage to internal parts by immediately responding to the error when the cooling fan malfunctions.

In addition, the cooling fan is not driven when heat radiation is not required in accordance with a luminance value of the backlight unit so that the standby power consumption can be reduced, a lifetime of the cooling fan can be extended, and convenience of cooling fan maintenance can be increased.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A liquid crystal display (LCD) apparatus comprising:
an LCD panel which displays an image;
a backlight unit which is formed of a plurality of light emitting diodes (LEDs) and emits light to the LCD panel;
a cooling fan which radiates heat generated from the backlight unit;
a fan driver which drives the cooling fan; and
a controller which selectively either controls the fan driver to set a rotation speed of the cooling fan based on a luminance value of the backlight unit or controls the backlight unit to set a luminance value of the backlight unit based on the rotation speed of the cooling fan,
wherein the controller measures a luminance value of the backlight unit and detects the rotation speed of the cooling fan, and
wherein the controller evaluates the rotation speed of the cooling fan, and if the controller determines that the rotation speed of the cooling fan is less than a reference speed as a result of the evaluation, the controller controls the backlight unit to reduce the luminance value of the backlight unit.

2. The LCD apparatus of claim 1, wherein the controller controls the fan driver to reduce the rotation speed of the cooling fan to be less than a reference speed when the luminance value of light emitted to the LCD panel is less than a reference luminance value.

3. The LCD apparatus of claim 1, wherein the controller controls the rotation speed of the cooling fan or the luminance value of the backlight unit based on a lookup table in which a rotation speed corresponding to a luminal value is stored.

4. The LCD apparatus of claim 1, wherein the controller receives a tacho signal of the cooling fan to detect the rotation speed.

5. The LCD apparatus of claim 1, wherein the controller controls to display at least one of the rotation speed, the luminance value, and an operation status of the cooling fan on the LCD panel.

6. The LCD apparatus of claim 2, further comprising a storage unit in which at least one luminance value is set.

7. The LCD apparatus of claim 6, wherein the controller controls the fan driver to rotate the cooling fan with the rotation speed that corresponds to the luminance value selected by a user from the at least one luminance value stored in the storage.

8. A liquid crystal display (LCD) apparatus comprising:
an LCD panel which displays an image;
a backlight unit which is formed of a plurality of light emitting diodes (LEDs) and emits light to the LCD panel;
a cooling fan which radiates heat generated from the backlight unit;
a fan driver which drives the cooling fan;
a controller which controls the backlight unit to reduce a luminance value of light emitted to the LCD panel when a rotation speed of the cooling fan is less than a reference speed, wherein the controller evaluates the rotation speed of the cooling fan, and if the controller determines that the rotation speed of the cooling fan is less than the reference speed as a result of the evaluation, the controller controls the backlight unit to reduce the luminance value of the backlight unit.

9. The LCD apparatus of claim 8, wherein the controller receives a tacho signal of the cooling fan to detect the rotation speed.

10. The LCD apparatus of claim 8, wherein the controller controls to display at least one of the rotation speed, the luminance value, and an operation status of the cooling fan state on the LCD panel.

11. A liquid crystal display (LCD) apparatus comprising:
an LCD panel which displays an image;
a backlight unit which is formed of a plurality of light emitting diodes (LEDs) and emits light to the LCD panel;
a cooling fan which radiates heat generated from the backlight unit;
a fan driver which drives the cooling fan;
a controller which controls the fan driver to reduce a rotation speed of the cooling fan when a luminance value of light emitted to the LCD panel is less than a reference luminance value; and
a storage unit which stores at least one luminance value,
wherein the controller evaluates the luminance value of light emitted to the LCD panel, and if the controller determines that the luminance value of light emitted to the LCD panel is less than the reference luminance value, the controller controls the fan driver to reduce the rotation speed of the cooling, and
wherein the controller controls the fan driver to rotate the cooling fan with a rotation speed corresponding to the luminance value selected by a user from the at least one luminance value stored in the storage unit.

12. The LCD apparatus of claim 11, wherein the controller controls the fan driver to stop the cooling fan when the luminance value is less than the reference luminance value.

13. A method for controlling a liquid crystal display (LCD) apparatus having a backlight unit formed of a plurality of light emitting diodes (LEDs) and a cooling fan which radiates heat generated from the backlight unit, the method comprising:
detecting a rotation speed of the cooling fan;
determining a luminance value of light emitted from the backlight unit; and
selectively controlling either the rotation speed of the cooling fan based on a luminance value of the backlight unit or the luminance value of the backlight unit based on the rotation speed of the cooling fan,
wherein controlling the luminance value of the backlight unit includes evaluating the rotation speed of the cooling fan to determine whether the rotation speed of the cooling fan is less than a reference speed, and if the rotation speed of the cooling fan is determined to be less than the reference speed as a result of the evaluation, the luminance value of the backlight unit is reduced.

14. The method of claim 13, the detecting of the rotation speed comprises receiving a tacho signal of the cooling fan.

15. The method of claim 13, further comprising displaying at least one of the rotation speed of the cooling fan, the luminance value of light emitted from the backlight unit, and an operation status of the cooling fan state on the LCD panel.

16. The method of claim 13, wherein the selectively controlling comprises reducing the rotation speed of the cooling fan to be less than a reference speed when the luminance value of light emitted from the backlight unit is less than a reference luminance value.

17. The method of claim 13, further comprising storing at least one luminance value.

18. The method of claim 13, wherein controlling either the rotation speed of the cooling fan or the luminance value of the backlight unit is based on a lookup table in which a rotation speed corresponding to a luminal value is stored.

19. The method of claim 17, further comprising controlling the cooling fan to rotate with the rotation speed corresponding to the luminance value selected by a user from the stored luminance values.

20. A method for controlling a liquid crystal display (LCD) apparatus having a backlight unit formed of a plurality of light emitting diodes (LEDs) and a cooling fan which radiates heat generated from the backlight unit, the method comprising:
detecting a rotation speed of the cooling fan; and
controlling a luminance value of light emitted to an LCD panel according to the detected rotation speed,
wherein controlling the luminance value of the light emitted to an LCD panel includes evaluating the rotation speed of the cooling fan to determine whether the rotation speed of the cooling fan is less than a reference speed, and if the rotation speed of the cooling fan is determined to be less than the reference speed as a result of the evaluation, reducing the luminance value of the light emitted to an LCD panel.

21. The method of claim 20, wherein the detecting of the rotation speed of the cooling fan comprises receiving a tacho signal of the cooling fan.

22. The method of claim 20, further comprising generating an interface which displays the luminance value according to the rotation speed and displaying the luminance value on the LCD panel.

23. A method for controlling a liquid crystal display (LCD) apparatus having a backlight unit formed of a plurality of light emitting diodes (LEDs) and a cooling fan which radiates heat generated from the backlight unit, the method comprising:
determining a luminance value of light emitted from the backlight unit;
controlling a rotation speed of the cooling fan when the luminance value is less than a reference luminance value;
storing at least one luminance value; and
rotating the cooling fan with the rotation speed corresponding to the luminance value selected by a user from the stored luminance values,
wherein controlling the rotation speed of the cooling fan includes luminance determining whether the luminance value of light emitted from the backlight is less than the reference luminance value, and if the luminance value of light emitted from the backlight is less than the reference luminance value, reducing the rotation speed of the cooling fan.

24. The method of claim 23, comprising stopping the cooling fan when the luminance value is less than the reference luminance value.

* * * * *